(Model.)

3 Sheets—Sheet 1.

C. LIDREN.
HARVESTER REEL.

No. 342,700. Patented May 25, 1886.

WITNESSES
Phil C. Dietrich.
H. R. Keyworth

INVENTOR
Christopher Lidren
By
H. S. Alexander
Attorney (Model.)

3 Sheets—Sheet 2.

C. LIDREN.
HARVESTER REEL.

No. 342,700. Patented May 25, 1886.

WITNESSES
Phil. C. Dietrich.
H. R. Keyworth

INVENTOR
Christopher Lidren
By W. Alexander
Attorney (Model.)

C. LIDREN.
HARVESTER REEL.

No. 342,700. Patented May 25, 1886.

WITNESSES
Phil C. Dietrich.
W. R. Keyworth.

INVENTOR
Christopher Lidren
By
N. Alexander
Attorney

UNITED STATES PATENT OFFICE.

CHRISTOPHER LIDREN, OF LAFAYETTE, INDIANA, ASSIGNOR TO HIMSELF AND R. JACKSON, OF SAME PLACE.

HARVESTER-REEL.

SPECIFICATION forming part of Letters Patent No. 342,700, dated May 25, 1886.

Application filed March 6, 1885. Serial No. 157,904. (Model.)

*To all whom it may concern:*

Be it known that I, CHRISTOPHER LIDREN, of Lafayette, in the county of Tippecanoe and State of Indiana, have invented certain new and useful Improvements in Harvester-Reels; and I do hereby declare that the following is a full, clear, and exact description thereof, reference being had to the accompanying drawings, and to the letters of reference marked thereon, which form a part of this specification, in which—

Figure 1:
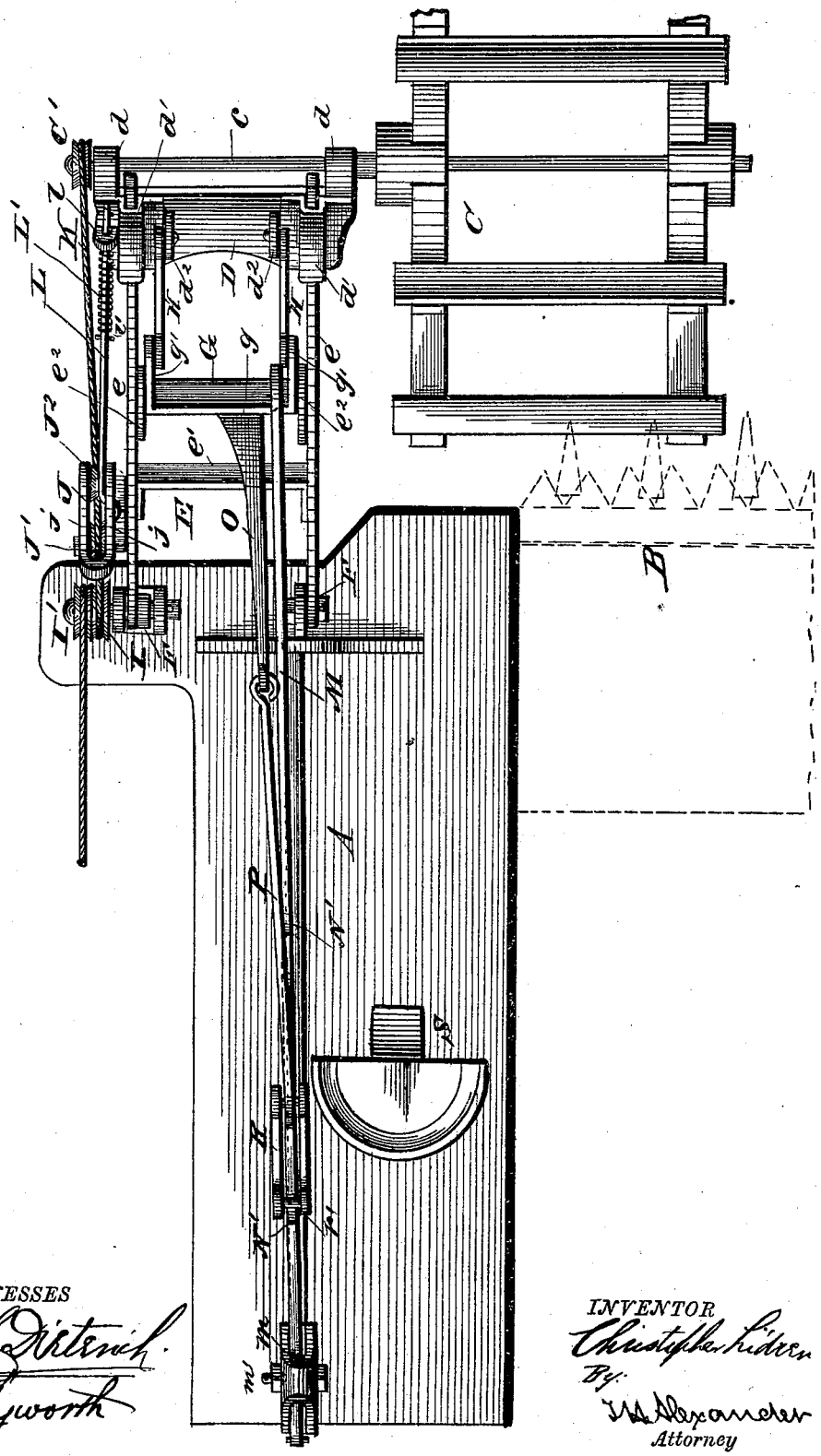
Figure 2:
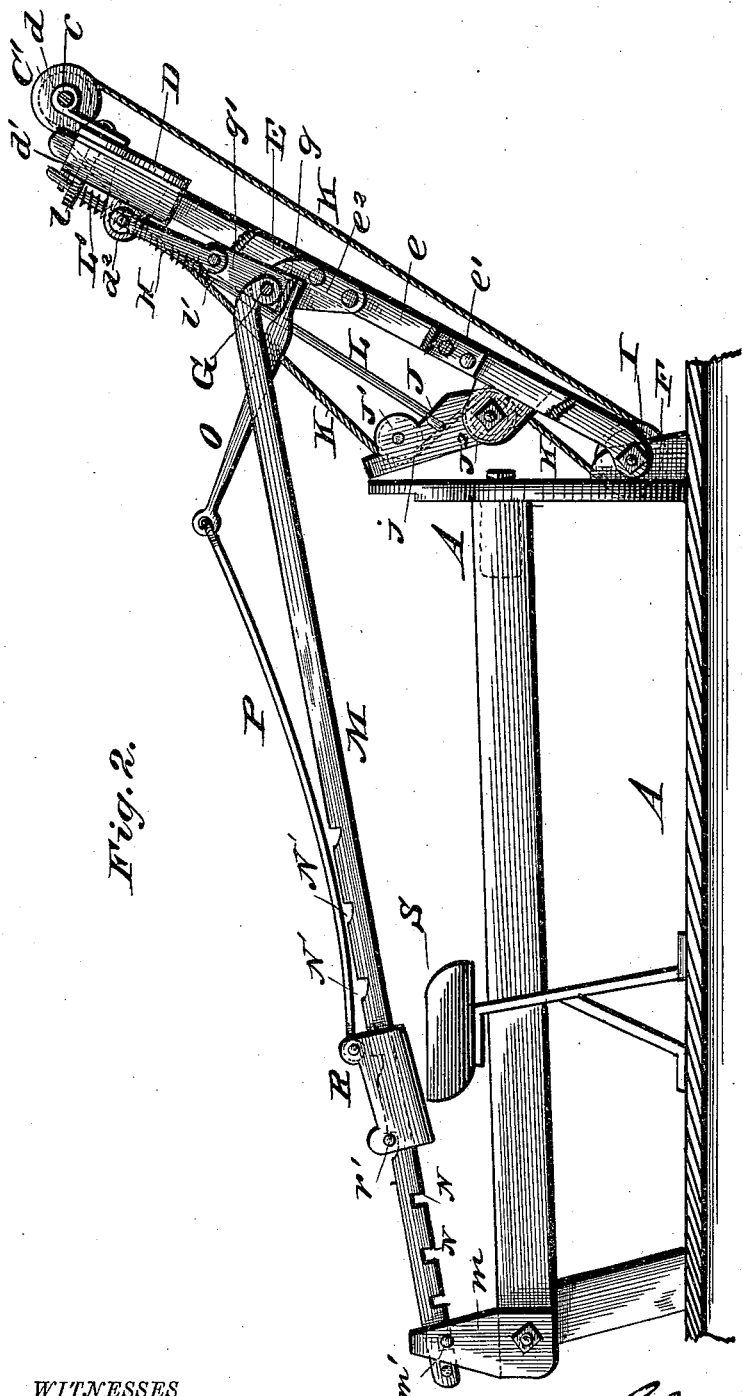
Figure 3:
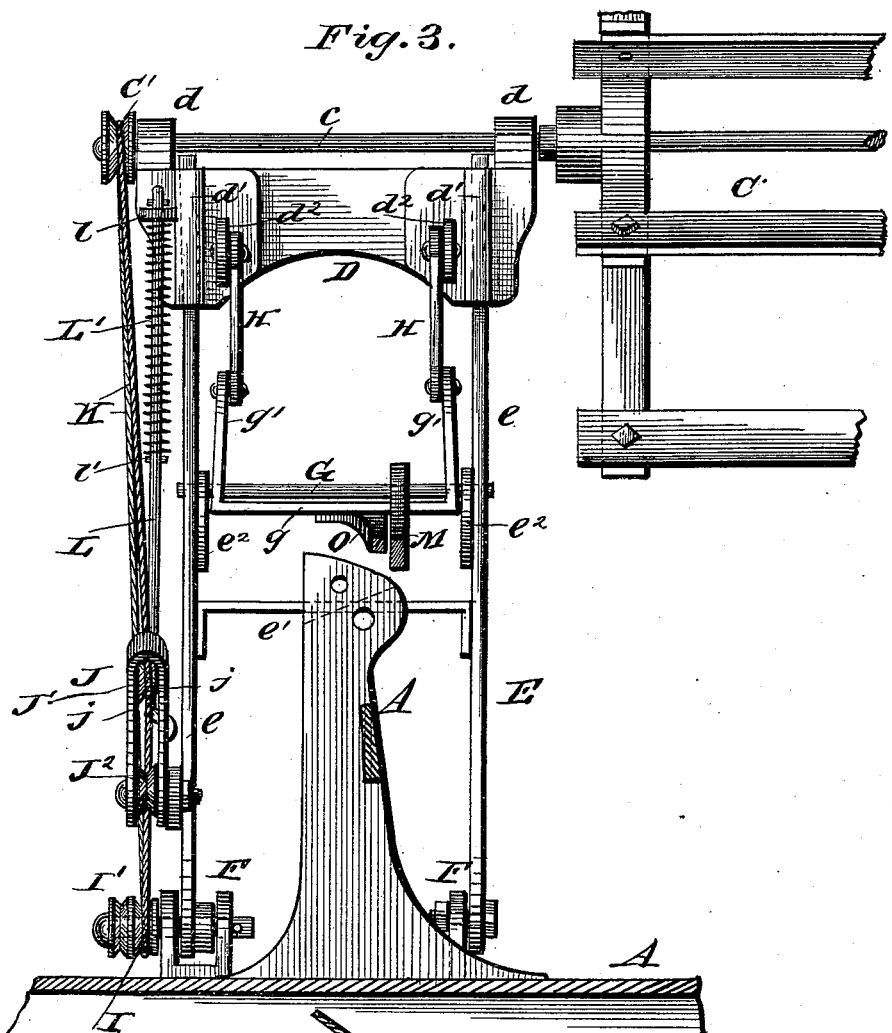
Figure 4:
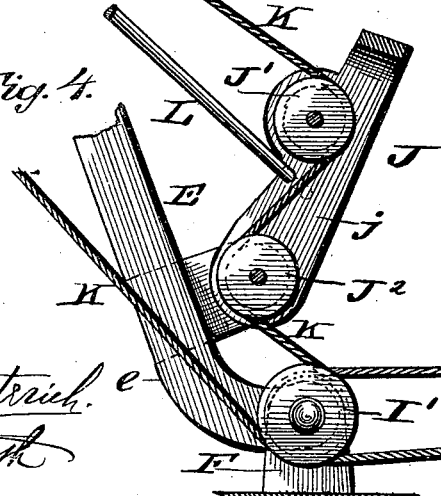

Figure 1 is a plan view of my improved reel-adjusting device. Fig. 2 is a side elevation of the same, partly in section. Fig. 3 is a vertical section of the same, looking from the machine. Fig. 4 is a detail view of a portion of the reel-operating mechanism.

This invention relates to the reel attaching and adjusting mechanism of harvesting-machines, its object being to provide means whereby the reel may be adjusted forward and back in relation to the cutter-bar while keeping the band that actuates the reel at the requisite tension.

The invention consists in the construction and novel arrangement of parts hereinafter described, and pointed out in the appended claims.

A represents the frame of a harvester, having attached the cutter-bar B, of usual construction.

C is the reel, of ordinary construction, the shaft $c$ of which has its inner part supported by the bearings $d\,d$ at the upper end of a frame, D. This frame D is made, preferably, of plate form, having its bearings $d\,d$ at its upper corners, and is provided on its inner surface with the vertical slideways $d'\,d'$, for a purpose hereinafter explained.

$d^2\,d^2$ are brackets standing from the inner surface of the frame D inward from the slideways $d'$. The shaft $c$ of the reel has on its end to the inner side of the bearings the pulley C'.

E is a rectangular frame, composed of the longitudinal side bars, $e\,e$, pivoted at their lower ends upon uprights F F, rising from the main frame, and preferably made in one piece therewith, and the transverse bar $e'$.

$e^2\,e^2$ are opposite ears secured to and standing inward from the side bars, $e$. The upper ends of the said bars pass into the slideways $d'$, the frame D reciprocating longitudinally upon the frame E.

G is a transverse shaft having bearings in the ears $e^2$, and carrying upon it the bar $g$, the ends $g'\,g'$ of which bend upward at right angles to its middle portion, and have their upper ends pivoted to the lower ends of links H H, the upper ends of which pivot on the brackets $d^2\,d^2$ on the frame D. The ends $g'\,g'$ and links H H form toggle-joints, which, when the bar $g$ is oscillated on the shaft G, causes the frame D to reciprocate on the frame E.

I is a pulley on the outer end of the shaft of the rear bearing of the frame E, at the lower end of said frame. The pulleys I and C' are in or nearly in the same vertical plane from front to rear.

I' is a pulley or sprocket-wheel adjacent to the pulley I on the same shaft, and receiving motion from a band or chain which connects it with a similar pulley or sprocket-wheel on the axle, or one of the wheels of the machine.

J is a frame pivoted upon the inner side bar, $e$, between the lower end thereof and the transverse bar $e'$. The frame J is composed of two side strips, $j\,j$, having pivoted between them at their ends the pulleys J' J$^2$. The band or cord K runs over the pulleys C', I, J', and J$^2$, and is kept always about the same tension by means hereinafter described.

L is a rod pivoted at its lower end upon the frame J, and having its upper end passing through a loop or ring, $l$, secured to the frame D.

L' is a coil-spring surrounding the upper end of the rod L and bearing against the under surface of the loop $l$ and against a stop, $l'$, passing through the rod.

M is a rod extending longitudinally of the main frame A, or at right angles to the shaft of the reel. The front end of said rod is pivoted upon the shaft G, and its rear end passes through a directing-keeper, $m$, secured to the rear end of the main frame. This loop is provided with a transverse pin, $m'$, which engages in notches N on the lower edge of the bar M, holding the connected frames D and E nearer to or farther from the perpendicular.

O is a lever-arm secured to the middle portion of the bar $g'$, and extending rearward therefrom, the end of said lever-arm being connected by a link-rod, P, to the front end of a slide, R, which travels on the bar M. The slide R is provided at the upper corner of its outer end with a transverse pin, $r'$, which engages in notches N' on the upper edge of the bar M, so as to hold the frame D at different heights on the frame E by the means hereinafter described.

It is evident from the foregoing description that the reel is set farther forward or backward in relation to the cutter-bar, notched bar $m$, and the pin $m'$, and that its height is regulated by the sliding of the frame D on the frame E by means of the toggle-links H $g'$ $g'$, bar $g$, lever-arm O, link-rod P, slide R, pin $r'$, and notches N' in the upper edge of the bar M. It is also evident that the reel-adjusting mechanism is adapted to be used with any style of harvester, whether self-binding or not.

In practice the uprights upon which the frame E is pivoted and the standards which carry the binder and compressor-arms and their actuating mechanism are made in one piece with the main frame A, thus lessening the cost and simplifying the construction of the main frame. The said binder and compressor arms and their actuating mechanism form subjects of a separate application for Letters Patent, Serial No. 157,903, filed even date with this.

When the frames D and E are swung together about the pivot of pulley I as a center, the relative positions of the pulleys C', I, J', and $J^2$ are unchanged, and the band or cord K is kept at the same tension; but when the frame D is slid up or down on the frame E the action of the rod L and spring L' swings the frame J on its pivot, and consequently oscillates the pulley J', so as to keep the cord or band K always at the proper degree of tension to drive the reel. The cord will therefore drive the reel whatever may be the position of the latter in relation to the cutter-bar.

S is the driver's seat, so secured to the main frame that the rod M, link-bar P, and slide R will be within easy reach of the driver, who can thus at all times adjust the reel to the different positions required in operating the machine.

Having described my invention, I claim—

1. In a harvester, the combination, with the frame of the machine A, of the swing-frame E, pivoted on the frame A, the frame J, pivoted on the side of the frame E, sliding frame D, longitudinally adjustable on the frame E, the reel-shaft $c$, pulleys C', I, J', and $J^2$, actuating-cord K, rod L, and coiled spring L', substantially as specified.

2. In a harvester, the combination of the frames A, D, and E, the reel-shaft $c$, the bar M, provided with the notches N', the transverse shaft G, bar $g$, provided with the arms $g'$ $g'$, links H H, lever-arm O, link-rod P, and slide R, longitudinally adjustable on the bar M, and provided with the pin $r'$, adapted to engage said notches, substantially as specified.

3. The combination of the frames A, D, and E, the reel-shaft C, the bar M, having the notches N', the keeper $m$, provided with the pin $m'$, adapted to engage said notches, the transverse shaft G, bar $g$, links H H, lever-arm O, link-rod P, slide R, and means, substantially as described, for adjustably securing said slide on the bar M, substantially as set forth.

4. In a harvester, the combination of the reel C, the frames A, D, E, and J, pulleys C' I J' $J^2$, carrying the band K, shaft G, bar $g$, links H H, lever-arm O, link-rod P, slide R, provided with the pin $r'$, bar M, provided with the notches N N', and keeper $m$, provided with the pin $m'$, substantially as specified.

In testimony that I claim the foregoing as my own I affix my signature in presence of two witnesses.

CHRISTOPHER LIDREN.

Witnesses:
D. E. STUDEBAKER,
O. M. MITCHELL.